United States Patent [19]

Schloss

[11] 4,051,725
[45] Oct. 4, 1977

[54] HAND-HELD ANEMOMETER

[76] Inventor: Alden Schloss, P.O. Box 4862, N. Hollywood, Calif. 91607

[21] Appl. No.: 680,376

[22] Filed: Apr. 26, 1976

[51] Int. Cl.² .............................................. G01F 1/28
[52] U.S. Cl. ...................................... 73/228; 267/179
[58] Field of Search ................ 73/228, 189, 186, 188; 267/179

[56] References Cited

U.S. PATENT DOCUMENTS

| 868,152 | 10/1907 | Atkinson | 73/228 |
|---|---|---|---|
| 2,889,707 | 6/1959 | Snider | 73/228 |
| 2,979,948 | 4/1961 | Gwathmey | 73/228 |
| 3,796,097 | 3/1974 | Ruskin | 73/228 |
| 3,826,136 | 7/1974 | Chang | 73/228 X |
| 3,962,918 | 6/1976 | Rosaen | 73/228 |

Primary Examiner—Jerry W. Myracle
Assistant Examiner—Charles Gorenstein

[57] ABSTRACT

An instrument for measuring wind velocity, utilizing impact wind pressure against a movable vane. A spring is used as a mechanical reference and, as such, balances the impact wind force generated against the vane. Flexible means are used to transfer vane motion to a circular indicator disc, which is calibrated in wind speed. Design of kinematic geometry, as well as a unique, non-linear, spring arrangement are employed to counter the square law wind force. Such employment is essential to prevent crowding at the low end of the speed-indicating scale, while maintaining practical full scale values, in a highly sensitive instrument.

9 Claims, 11 Drawing Figures

U.S. Patent  Oct. 4, 1977  4,051,725
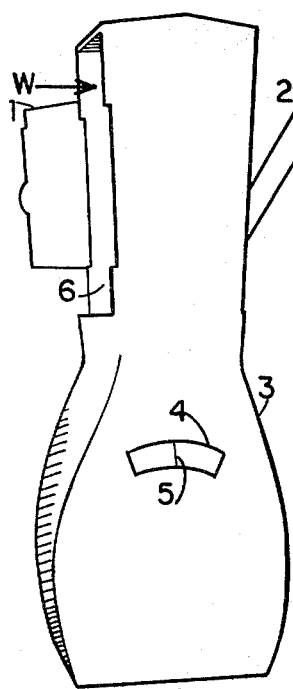
FIG.1
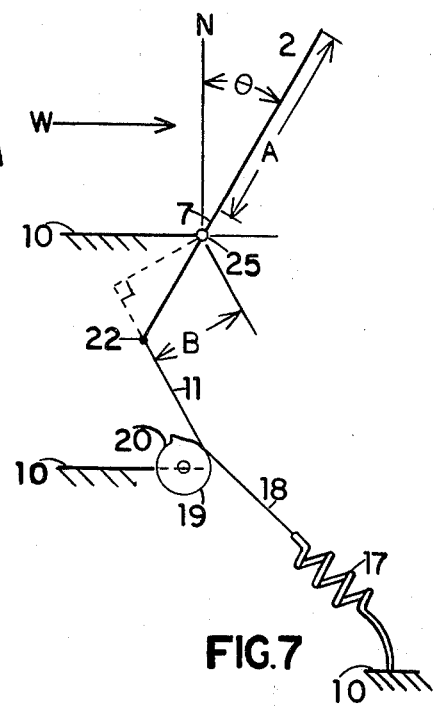
FIG.7
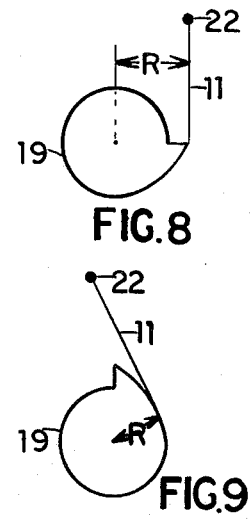
FIG.8
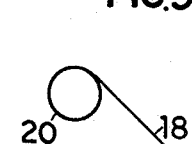
FIG.9
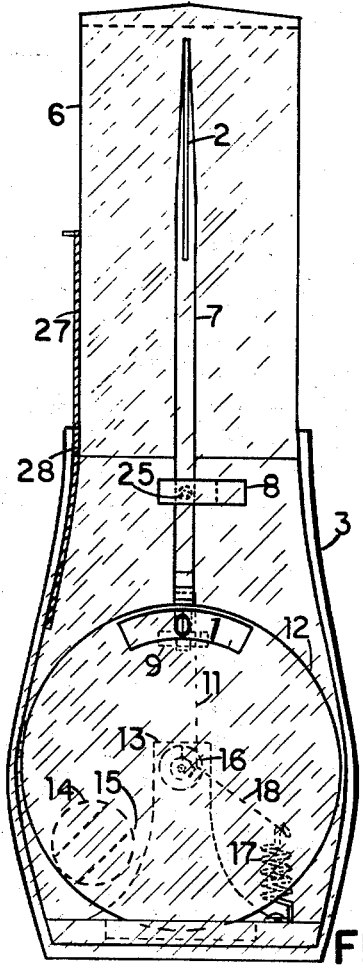
FIG.2
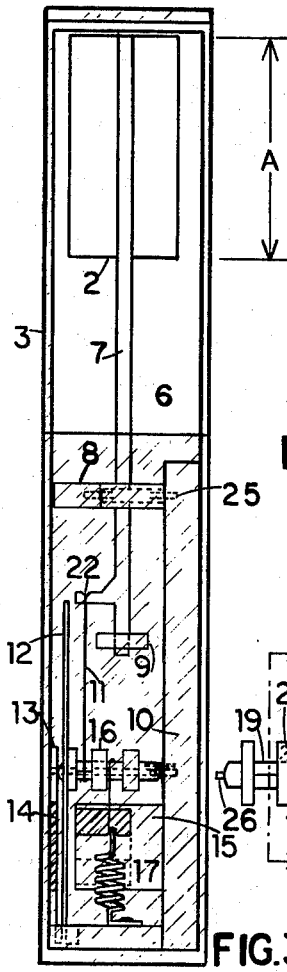
FIG.3
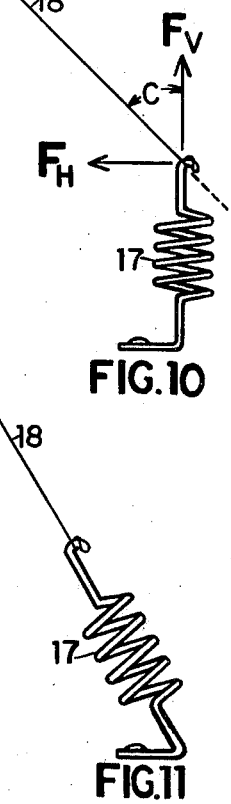
FIG.10
FIG.6
FIG.11
FIG.4
FIG.5

HAND-HELD ANEMOMETER

SUMMARY OF THE INVENTION

This invention relates in general to air speed-indicating devices and more particularly to a portable type, most convenient for yachtsmen and air-conditioning technicians. Previous art has employed the whirling cup in a scaled-down version of the type employed by weather stations. Such instruments supposedly provide linear torque output versus wind speed. When they are scaled down to hand-held size, the torque, relative to practical bearing friction, diminishes to the point where there can be no indication below about five knots of wind speed. The static vane type provides much greater useful torque at the cost of severe non-linearity. Wind impact pressure varies as the square of wind velocity, and a direct application results in severe crowding of the low end of any indicator scale, where one is most interested in discerning wind speed differences, as between one and two knots. Increasing sensitivity (to cause greater low end spread), by reducing the balancing spring rate is a poorsolution, as it will result in a very low and impractical, full scale reading. U.S. Pat. Nos. 3,826,136 and 3,796,097 are of the direct non-linearizing type. Spring balanced vane instruments go back at least to U.S. Pat. No. 1,111,684, issued Sept. 22, 1914. There is a small inadvertant linearization in all rotating vane types, due to the cosine of the angle that the vane travels through, but such is not sufficient to properly uncrowd the low end readings. Prior art has also been concerned with the relatively high velocity experienced by sports participants and these devices did not address themselves to the problem of reading very low velocities (below one knot). Prior vane art has also failed to address itself to the problem of reading wind velocity during gusty conditions. Unlike the whirling cup instruments, with their large moment of inertia and lack of counterforce, vane types respond very quickly to sudden changes in wind (gustiness) and taking a reading is very difficult. There are means provided in this instrument to provide short term averaging of wind velocity. Such is called damping and prevents jerky, quick motions of the indicator, without adding friction, which would reduce sensitivity.

A primary object of this invention is to provide high sensivity in an instrument for reading wind velocity.

A further object of this invention is to provide linear read-out while utilizing impact wind pressure.

Another object of this invention is to so reduce complexity that the device may be priced for the mass market.

A final object of this invention is to provide an instrument with a controlled amount of damping for the purpose of obtaining steady readings under gusty conditions.

The foregoing and other objects are realized in the present invention, by a device having linearizing kinematic means for countering square law wind force. Cam means, non-linear spring means and drag coefficient modifier means are used as further refinements in the linearization process. Damping means are provided to allow steady readings under gusty conditions.

A better understanding can be had from the following description and the accompanying drawings (obvious fastening devices have been omitted to enhance clarity).

FIG. 1 is a perspective view of the device with door-type of air flow restrictor 1 open;

FIG. 2 is a front view of the device in a transparent case to allow a view of normally concealed parts, including an edge view of a sliding panel air flow restrictor;

FIG. 3 is a side view of the device in transparent case, air flow restrictors removed;

FIG. 4 is an enlargement of the drum 16 shown in FIG. 3;

FIG. 5 is a cross-section through the drum 16, taken on the line 5—5 in FIG. 4, showing zero-stop means;

FIG. 6 is a cross-section through the drum 16, taken on the line 6—6 in FIG. 4, showing a cam, in first drum section 19;

FIG. 7 is kinematic schematic of vane, flexible means, drum and spring;

FIG. 8 is an enlargement of FIG. 6, showing cam in its initial rest position;

FIG. 9 shows a cam rotated to an intermediate position;

FIG. 10 shows the second drum section, lower flexible means and spring, in initial rest position; and FIG. 11 shows the second drum section, lower flexible means and spring in an intermediate position.

The preferred embodiment of the instrument has two scales, low and high. Scale change is accomplished by closing the air flow restrictor 1 (FIG. 1) which in FIG. 1 is a door. When the door is closed, it partially restricts air flow due to the wind. Such flow restriction reduces wind impact pressure and a higher wind velocity is required to cause the instrument to read full scale. A panel which can be made to slide into the case when not in use, and which can be so positioned as to partially restrict air flow, may accomplish the same purpose. Panel 27, which slides on internal grooves 28 in case 3, is shown on edge in FIG. 2. A cap with a small opening placed over the duct 6 part of the case may also accomplish the same purpose. All such means will be referred to as "air flow restrictor."

Operation is as follows: Wind enters duct 6 (FIG. 1) and wind impact pressure develops a force against the vane 2. The force is proportional (for a given wind) to the area of the vane, whose length is A, as shown in FIGS. 3 and 7. The vane (mounted on vane arm 7) pivots about vane arm pivot 25 (FIGS. 2, 3 and 7). The wind force on the vane then results in a torque which tends to rotate the vane 2, as shown by the arrow in FIG. 1. The attachment arm 22 (FIGS. 2 and 3) is an extension of the vane arm on the opposite side of the vane arm pivot. The attachment arm serves as a means to connect to the upper flexible means 11 (FIGS. 2 and 3). The upper flexible means extends to and wraps at least once about a first drum section 19, on drum 16, whereupon it may be fastened to the drum. The drum 16 is pivotally mounted. The entire flexible means (upper and lower) may be, typically, fine silk thread. In the embodiment shown, the drum 16 has a second drum section 20 and a slit 21 in the partition between the two sections. The slit is in a plane coincident with the axis of the drum and extends radially outward from a radius greater than that of the drum shaft 26. In the embodiment shown, the upper flexible means continues through the slit and contacts the second drum section, whereupon it becomes the lower flexible means. The slit is not absolutely necessary and the lower flexible means could simply be fastened at the second drum section. In FIGS. 3 and 4, the first drum section is shown positioned toward the front of the instrument (where the window 4 is placed) and the second drum section is positioned toward the rear. Such placement has no bearing on the operation and the two sections may be reversed in position. First, then, merely refers to that section wherein the upper flexible means attaches. Second refers to that section wherein the lower flexible means attaches. The two drum sections may both be of circular cross-section or may be any combination of circular cross-section and positive and negative cams. Cams will be further explained later, under the heading "Cam Means." If both sections (first and second) of the drum are equal in diameter, the drum serves (in addition to its rotation) to transmit the tension in the lower flexible means, without change (neglecting friction) to the upper flexible means. If the two sections are circular but of unequal diameter, the two tensions will be different and a spring of different rate will be required to get the same results obtained by a drum having equal sections. When the upper flexible means 11 is pulled by the vane arm 7, it unwraps from the first drum section and causes rotation of the drum, whereupon the lower flexible means winds on to the second drum section. When the lower flexible means so winds, it pulls on and (in the embodiment shown) tends to bend over, as well as extend, a spring 17. Such bending and extending is properly called deflecting. Such deflection of the spring causes tension to build up in the lower flexible means, in proportion to the amount of deflection. When sufficient tension (relative to a given wind velocity) is built up in the lower flexible means, enough tension is transmitted to the upper flexible means to provide a counter torque (via the lower part of the vane arm) to the torque (and hence force) generated by the wind on the vane. All motion of the vane, both flexible means and the drum then stops. Therefore there is some proper tension in the lower flexible means, which will cause balance of the wind force and which will cause all motion to stop. A change in wind velocity requires a different amount of spring deflection and tension to again stop all motion. All motion and the drum, stop at particular degrees of rotation, which correspond to particular wind velocities. Indicator disc 12 is axially attached to drum 16, rotates with it and bears calibration numerals. The numerals show through the window 4 (FIG. 1) and hairline 5 (FIG. 1) indicates the numeral to be read. In the preferred embodiment, two sets of numerals, in concentric arcs, appear on the indicator disc; only one set is shown in FIG. 2, for the sake of clarity. With the air flow restrictor open, the upper set of numerals is read. With the air flow restrictor 1 closed, the lower set of numerals is read. The preferred embodiment employs a disc bearing numerals; a pointer attached to the drum, which is caused to rotate and point to fixed numerals, may serve as well and so the generic, "indicator," may be used for any such means of indication.

To assure a proper and consistent zero reading, in the absence of wind, means are included for the purpose. Most spring balanced instruments typically employ counterwound spiral springs, for balancing the measured effect. Due to changing ambient conditions and variables within the instrument, there must be an external means to adjust these springs, so that the instrument will read zero when it should. To avoid the necessity of such adjustment (and its additional cost) the present invention uses a stop, as shown in FIG. 5. A small drum pin 24 protrudes from the drum 16 and contacts the stop 23, which is fastened to the sub-chassis 10. The lower flexible means also has a small amount of pre-wrap on the second drum section; adjustment of the spring position is used to produce a small pre-load tension in the lower flexible means, which causes the lower flexible means to unwrap in the absence of an applied wind, and causes the drum and drum pin 24 to rotate against the stop 23. In this position, zero on the indicator disc lines up with the hairline 5 (FIG. 1). A counterweight 9 (FIGS. 2 and 3) balances the vane and vane arm. Balance is necessary to prevent gravity from influencing the reading as the vane reaches any position not directly over the vane arm pivot and to prevent inertia from causing erroneous readings in cases where the whole instrument is accelerated due to a sudden movement of the vehicle upon which the instrument may be carried. Vane arm support 8 (FIGS. 2 and 3) completes the front part of the vane arm pivot 25. Sub-chassis 10 supports the rear of the pivot. Front support 13 (FIGS. 2 and 3) bears the front of the drum shaft 26 (FIG. 4), while the sub-chassis 10 (FIGS. 2 and 3) bears the rear end of the drum shaft 26. Sub-chassis 10 also provides mounting for spring 17.

LINEARIZING KINEMATIC MEANS

Refer to FIG. 7 and note that this is a kinematic schematic; only symbols appear for physical parts. Reference numerals in FIG. 7 are for the corresponding physical parts. For example, the attachment arm 22 of FIG. 3, appears as a point in FIG. 7. The geometry of the kinematic means determines the amount of linearization that will occur after about the first 20° of rotation of the vane. As the wind (W in FIGS. 1 and 7) increases in velocity the vane arm 7 rotates to an angle theta (FIG. 7). The normal projection N (to the wind) of the dimension A (length of vane) in FIGS. 3 and 7 shortens in proportion to the cosine of theta. Hence the area of th vane and force generated by the wind on the vane, also reduce by the cosine of theta. The effective moment arm (about vane arm pivot 25) of the vane is also shortened by the cosine of theta. Therefore the torque tending to rotate vane arm 7 about pivot 25 is modified by the cosine squared of the angle theta. Practical considerations dictate nominal values of vane deflection to about 45° and of low scale velocity limit to about 25° knots. It can be shown that for such, the cos squared effect (operable in all rotating vane devices) is not, in itself, sufficient to linearize read-out indication with wind velocity. Therefore, one more kinemetric factor will be used. The counter torque, required to bring the vane arm 7 to rest, is applied by the tension in the upper flexible means and the variable moment arm, dimensioned B in FIG. 7. It can be shown that the dimension B varies in proportion to the sin of the angle theta. The tension in the upper flexible means causes a counter torque to bring the vane to a balance position. The counter torque then gains in mechanical advantage as the angle theta increases in response to higher wind velocities. Therefore, there are two kinematic effects tending toward linearization. The cosine squared effect reduces the applied wind torque over what it would be without the effect. The increasing moment arm (the sin effect) increases the retarding torque over what it would be without the sin effect. The combination of these two effects is practical for causing linearization after about 20° of rotation of the vane. By proper sizing of the lengths about pivot point 25 and positioning of the spring 17, one may obtain any degree of linearization. Absolute linearity is obtained when $n$ equals one in the relationship, Alpha equals K times V raised to the power $n$. Where Alpha is the angle through which the drum turns, K is a proportionality constant and V is the wind velocity. Overcompensation may also be obtained, in which case the lower end of the scale will be spread and the upper end crowded; in that case $n$ is some number less than one. Due to considerations of size, it is not practical to impose all of the required linearization through geometry alone. It is most practical to obtain lineariation for about the first 20° of vane rotation by other means.

CAM MEANS

A cam is used as partial compensation in the zero to about twenty degree range of vane motion. First drum section 19 (FIGS. 4 and 6) is shown enlarged in FIGS. 8 and 9. FIG. 8 shows first drum section 19 as a cam in its initial rest position, corresponding to zero read-out. The upper flexible means 11 is then positioned vertically (in a vertically held instrument) and rests on the cam at an initial radius R, that is greater than the final radius of the cam. The final radius of the cam is equal (in this instance) to the radius of the second drum section 20, shown to a different scale in FIGS. 4, 5, 10 and 11. When the drum rotates at least 20° the upper flexible means is in position, as shown in FIG. 9, and rests at the final cam radium. Since (initially) the upper flexible means 11 is at a greater radius than the lower flexible means, its mechanical advantage is greater and (neglecting friction in the drum bearings) the tension in the upper flexible means is less than that in the lower flexible means, by the ratio of the two radii. With equal radii in the two sections, the drum merely transmits spring tension. Therefore, while the cam is in position to cause reduced upper tension, it has the same effect as though a spring of lower rate were in use. With such a cam then, more vane and indicator motion is allowed before there is sufficient tension in the upper flexible means to counter wind generated torque on the vane. Hence, the cam counters, to an extent, the square law wind force. The cam described was one in which the initial radius was greater than the final radius. Such a cam may be called a positive cam. The opposite, a cam in which the initial radius is less than the final radius, may be called a negative cam. A negative cam placed in position at the second drum section would produce precisely the same results as the positive cam, placed at the first drum section. A combination of both a negative and positive cam, properly placed, would have similar results, but may not be warrented, in view of the extra cost to manufacture. It must be pointed out that, for the sake of clarity in explaining tension ratios above, the minimum radius of the positive cam was made equal to the radius of the second drum section. It doesn't matter that this be so for the cam action to work. The cam functions just so long as there is a difference in radius initially, relative to a radius employed later, at any section using the cam. Again, a radius of any other dimension, used for the other section, simply means the spring rate must be different to obtain the same full scale reading. Attempting to get all of the required linearization through the use of cams, would result in a cam of impractical dimensions and other means are also used to get the required linearization within the first twenty degrees.

NON-LINEAR SPRING MEANS

When a coil spring is deflected axially within its elastic limits, it resists uniformly, in proportion to the deflection, to the shearing modulus of elasticity and to the wire diameter (to the fourth power) and inversely, in proportion to the number of turns and to the coil radius (cubed). A beam fixed at one end and loaded at right angles at its free end, resists uniformly, in proportion to the deflection, modulus of elasticity and sectional moment of inertia and inversely, in proportion to its length (cubed). Since there is total freedom in selection of wire size, number of turns, diameter and length of spring, it is possible to construct a spring having different spring rates in two directions of deflection (a coil rate for extension and a beam rate for transverse deflection). In this instance, it would be advantageous for the rate due to the beam formula to be much lower than the rate due to coil formula. The spring is caused to deflect by a tension in the lower flexible means. For just the system consisting of the lower flexible means second drum section and the spring alone, it can be considered that a force is applied (or transmitted) to the lower flexible means, at the surface of the second drum section 20 (FIG. 10). This point of force transmission is stationary and is so positioned with respect to the spring that the flexible means (which is in tension) must approach and connect to the spring at an angle C, as shown in FIG. 10. The angle C is measured with respect to one of the directions of deflection; here, it is the axial direction. The other direction of deflection, in this case, is orthogonal to the first. ((In this case, the position of the stationary point of force transmission is at the surface of the second drum section and force transmission to the flexible means is due to the rotation of the drum. In any other system requiring a non-linear spring arrangement, said stationary point may be at a guide rail, within a loop or at the periphery of a freely rotating pulley. Any such means which will cause and allow the flexible means to pass some stationary point (placed, as described, relative to the position of the spring) will work. In such cases the flexible means continues beyond the said point, whereupon the desired force is applied to the flexible means. It is the tension thus created (by the applied force) throughout the means, that transmits the force. By such guides the direction of the applied force may be different than that of the line (as above described) between the said point and the spring. Such guides then allow application of force in any direction without disturbing the described geometry.))

The force transmitted by the lower flexible means (as tension) can be resolved into two components, vertical and horizontal, as shown by the two arrows at the top of the spring in FIG. 10. The vertical component causes deflection in an axial direction, corresponding to the coil spring rate, and the horizontal component causes deflection transversely, in the direction corresponding to the beam spring rate. By proper positioning, one may choose any initial ratio between these two force components. As described above, any ratio, as well as the absolute values of the two spring rates may also be chosen. Considering FIG. 10, it can be seen that the tension in the lower flexible means is opposed by a resultant of the spring's resistance to deflection in two directions. That resultant resistance (or effective initial spring rate) can, as described, be lower than the rate experienced by an axial loading of the spring only. As the lower flexible means winds on to the second drum section, the spring bends over and finally assumes the position, as shown in FIG. 11. Here, tension is applied axially and only the coil spring rate applies, which by design is higher than the beam rate or resultant combination of beam and coil rates. The lower flexible means first experiences a low spring rate and finally experiences a high spring rate, as deflection of the spring progresses. Any such spring system which can so effectively change its rate with deflection, behaves non-linearly. It must be pointed out that though any spring may inherently have two rates in different directions, such will not come in to use, unless so arranged for by the described combination. It is the combination of the stationary point of force transmission, the flexible means attaching at an angle to a spring and the spring with two rates, which gives rise to a system exhibiting non-linear spring action and not the spring alone. Note also, that the transition from low rate to high rate is smooth, there being no step change in spring rate. In addition, the spring for such a purpose need not be a coil spring and the two different direction of deflection (and attendant rates) need not be orthogonal. Any structure, such as a ribbon spring, folded accordian fashion, or a beam spring, inside a rubber tube, which can be deflected in any two different directions and which exhibit different rates in those two directions, will work in the described combination. Note in FIG. 10 that the initial angle C, of attachment of the lower flexible means, is such that an extension of the line of attachment (dashed line FIG. 10) does not go through the point at which the spring is mounted to the sub-chassis 10. If the angle C were initially zero, no non-linear action would result, since such an extension of the line of initial attachment would then go through the point of mounting and there would be no bending moment, and consequently, no change in any of the directions of deflection, as total deflection continues. On the other hand, the initial angle of attachment may coincide with the transverse direction of deflection, i.e., angle C equals 90°, and non-linear action does result, for now there is a bending moment, since the said line does not intersect the point of mounting, and with further deflection there is a bending over and consequent change in directions of deflection. It is the changing of the original directions of deflection which causes different spring rates to come into play with continued deflection, and hence the non-linear action. Coincidence in the transverse direction is only a special case. Any angle will work which allows the above condition to be met. Therefore, in addition to a spring, so constructed that it has at least two directions of deflection, (each direction having different spring rates) the flexible means must initially attach to the spring at such an angle that an extension of a line coincident with the said means passes at some distance from the point of mounting of said spring to its supporting structure.

It can be seen then, that as the vane responds to higher wind velocities, by attempting further arcuate rotation, the effective balancing spring rate increases, offsetting the square law wind force increase.

There is one final linearization means.

DRAG COEFFICIENT MODIFIER MEANS

The effectiveness of the vane to be pushed by the wind depends on its drag coefficient. In free air, the drag coefficient of a flat plate (the vane in this case) of finite proportions and of aspect ratio of about two to one, is slightly over one. A plate of infinite length has a coefficient of two. The case 3 extends and forms the duct 6 in close proximity to the vane 2. The duct prevents the air from flowing freely around the vane, and the vane assumes a drag coefficient approaching that of an infinite plate, namely two. (As can be seen from FIG. 1, the sides of the case forming the duct lie in a plane parallel to the plane described by the arc of the vane. The duct is also of such extension that it only partially covers the arc of the vane.) As soon as the vane emerges from the duct, as depicted in FIG. 1, the drag coefficient returns to the free air value of slightly over one. The vane is inside the duct at low air velocities, and is therefore aided by a higher drag coefficient. Since this aid to vane motion drops off as the wind increases, it acts as a final factor in linearizing read-out indication with wind velocity.

DAMPING MEANS

A magnet 15 (FIGS. 2 and 3) is placed in proximity to indicator disc 12, such that the magnetic field from its poles penetrates the disc. A magnetic return path 14 (FIGS. 2 and 3) is placed on the opposite side of the disc for the purpose of reducing the length of the air path, thus maximizing the field for a given size magnet. The indicator disc 12 must be made of an electrically conductive material. Considering weight and cost, aluminum would be a typical choice. As the disc moves through the magnetic field, circulating electrical currents are set up. Lens's law requires that the magnetic field associated with the circulating currents react with and oppose the field of the magnet. This opposition then retards motion of the disc and the force of retardation is proportional to the rate of motion of the disc and the strength of the magnetic field. Rapid motion is therefore impeded and the disc assumes an average position as dictated by a vane attempting to follow rapidly varying wind velocities. The retarding effect reduces as disc motion becomes less rapid and becomes zero when there is no motion. This means that there is only an effect with motion; the effect is not frictional in nature and so a final position is obtained which is dictated only by wind force and spring rate. For a constant wind, the disc assumes the same position it would if there were no magnet present. For a quickly varying wind, the disc assumes an average position within that variation. By adjusting the strength of the field, one may determine just what quickly means, or in other words, the period of averaging. Over relatively longer periods of time, if the wind assumes some greater (or lesser) average velocity (though still quickly varying) the disc assumes this new average position, still ignoring the relatively quick variations. Hence, one may be enabled to read an average of a gusty condition, yet still be able to read a change to a new average.

It is to be understood in the claims to follow, that the novelty presented thus far in the specification, is the many means for linearization which permit, at the same time, high sensitivity for good low scale readability and practical high scale values. It should be construed that the many linearization features may be used in any combination which may not necessarily include all of them. Minor variations of the features in this disclosure, which still come within the intent and equivalency of the appended claims, are intended to be embraced therein.

What I claim is:

1. An anemometer, comprising in combination, a vane to be exposed to the wind, said vane being pivotally mounted to a sub-chassis free to rotate in an arc due to force of said wind; connecting means connecting said vane to an upper flexible means, said flexible means extending to, wrapping about and attaching to a first drum section on a drum pivotally mounted on said sub-chassis; rotation of said vane causing a pull on said upper flexible means and causing same to unwrap from said first drum section, causing rotation of said drum; a lower flexible means attached to a second drum section on said drum and extending to and attaching to a spring mounted on said sub-chassis; rotation of said drum causing said lower flexible means to wind on to said second drum section and in so doing causing deflection of said spring; at some sufficient deflection, sufficient tension is applied to said lower flexible means to cause balance of the force applied by said wind; an indicator axially connected to said drum for the purpose of indicating wind speed at any position of said drum.

2. A combination comprising an anemometer, as in claim 1, in which said first drum section is a positive cam and said second drum section is of circular cross-section.

3. A combination comprising an anemometer, as in claim 1, in which said second drum section is a negative cam and said first drum section is of circular cross-section.

4. A combination comprising an anemometer, as in claim 1, in which said first drum section is a positive cam and said second drum section is a negative cam.

5. A combination comprising an anemometer, as in claim 1, in which said spring is deflectable in two different directions and has different spring constants in each of said directions; said spring being displaced relative to said second drum section, said lower flexible means attaching initially to the spring at an angle to the axis of the spring such that an extension of a line coincident with the said flexible means, passes at some distance from the point of mounting of said spring to said sub-chassis.

6. A combination comprising an anemometer, as in claim 1, in which said indicator is a disc of electrically conductive material, and in which a magnet is placed in close proximity to said disc, wherein the magnetic field emenating from said magnet penetrates said disc.

7. A combination comprising an anemometer, as in claim 1, in which the exterior case for said anemometer has, as an integral part thereof, extensions which form a duct through which the wind is directed; the sides of said duct lie in a plane parallel to a plane described by the arc of said vane and are in close proximity to said vane; said duct is of such extension as to only partially cover the arc of said vane, and in which said combination is included a counterweight, to balance said vane.

8. A combination comprising an anemometer, as in claim 1, comprising an air flow restrictor, said air flow restrictor being movable into two positions as to restrict the air flow to said vane, in one position of said restrictor and to allow unrestricted flow in the other position thereof for the purpose of changing scale of said anemometer.

9. A combination comprising an anemometer, as in claim 1, in which a pin is attached to said drum, to come in contact with a stop, mounted on said sub-chassis; the position of said pin and stop are such that contact occurs for that position of said drum corresponding to zero reading of the anemometer; a small pre-load tension applied by said spring assuring contact of said pin with said stop in the absence of wind upon said vane.

* * * * *